United States Patent Office 3,252,892
Patented May 24, 1966

3,252,892
OXIDATION OF MERCAPTO COMPOUNDS USING CORRINOID CATALYST
William K. T. Gleim, Island Lake, Ill., assignor to Universal Oil Products Company, Des Plaines, Ill., a corporation of Delaware
No Drawing. Filed Sept. 22, 1964, Ser. No. 398,382
14 Claims. (Cl. 208—206)

This invention relates to the oxidation of mercapto compounds and more particularly to the use of a novel catalyst in the oxidation of mercapto compounds.

Mercapto compounds describe the sulfur-containing compounds and include particularly hydrogen sulfide and the alkyl and aryl mercaptans. In one embodiment the mercapto compounds are contained in hydrocarbon distillate. For example, gasoline containing mercaptans is known as sour gasoline and must be treated to remove and/or convert the mercapto compounds in order for the gasoline to be used satisfactorily for the purpose. Other hydrocarbon distillates containing mercaptans include naphtha, jet fuel, kerosene, diesel fuel, fuel oil, residual oil, etc. It often is necessary to reduce the mercaptan content of the distillate to meet specifications. Sulfur compounds also are contained in normally gaseous hydrocarbon fractions, as well as in non-hydrocarbon substrates including water, alcohols, etc. Here again, removal and/or conversion of the mercaptans is required to improve the quality of the substrate. In another embodiment it is desired to convert into disulfides a fraction consisting primarily of mercaptan or a mixture of mercaptans. These conversions are accomplished using the novel catalyst of the present invention.

Another application of the novel process of the present invention is in the regeneration of alkaline solutions which previously had been utilized to remove a major portion of the mercaptans and other acidic compounds contained in hydrocarbon distillates. Preferred alkaline solutions comprise aqueous solutions of sodium hydroxide (caustic) and of potassium hydroxide. Other alkaline solutions include those of lithium hydroxide, rubidium hydroxide and cesium hydroxide. However, for economic reasons, the last mentioned compounds generally are not preferred. The alkaline solution generally is used as an aqueous solution of from about 2 to about 50% by weight concentration and, when desired, solutizers, solubilizing agents, etc., are employed including alcohols and particularly methanol, ethanol, etc., phenols, cresols, tannin, butyric acid, etc.

In still another embodiment, the present invention may be used in a combination of both of these steps; that is, the removal of a major portion of the mercaptans by extraction in an alkaline solution, followed by further reduction in the remaining mercaptan content by oxidation to disulfides. For example, a sour cracked gasoline is subjected to extraction with an alkaline solution to remove a major proportion of the mercaptans and the thus partly treated gasoline then is subjected to treatment in the novel method of the present invention to produce a sweet or substantially sweet gasoline by oxidizing all or a major portion of the remaining mercaptans to disulfides. The alkaline solution used in the first step of the process is subjected to regeneration by oxidation in the presence of the novel catalyst of the present invention in order to convert the mercaptides into disulfides and to recover caustic solution for use in treating additional sour gasoline. It will be noted that this combination serves to remove a major portion of the mercaptans from the gasoline and thus the gasoline will not contain a high concentration of sulfur compounds which are detrimental to the susceptibility of the gasoline to the addition of tetraethyl lead.

In one embodiment the present invention relates to a method of oxidizing a mercapto compound which comprises reacting said mercapto compound with an oxidizing agent in the presence of a corrinoid catalyst.

Any suitable catalyst containing the corrin configuration may be used in accordance with the present invention. The corrin configuration is illustrated in the following general formula, which also includes the accepted numbering system.

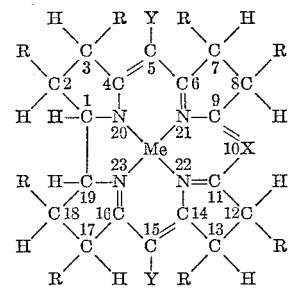

where Me is a metal, particularly selected from the group consisting of cobalt, vanadium, iron and manganese, R is selected from the group consisting of hydrogen, alkyl, aryl, hydroxyalkyl, hydroxyaryl, carboxyalkyl, carboxyaryl, hydroxy, hydroxyalkylamino, carboxyamino, carboxyalkylamino, carboxyarylamino, aminoalkyl, aminoaryl, mono-, di- or tri-alkylamino, mono-, di- or tri-arylamino and sulfonyl, Y is alkyl, and X is selected from the group consisting of CH, N, O, S and P.

The general formula hereinbefore set forth illustrates the basic corrin configuration. It is understood that the catalyst may contain the modifications as hereinbefore set forth and also other modifications, including a double bond in one or more of the positions between 2 and 3, 7 and 8, 12 and 13, and 17 and 18. However, the essential requirement is that it contains the six double bonds in conjugated relationship to the nitrogen atoms and no double bond or CH group between the No. 1 and No. 19 carbon atoms.

The corrin configuration differs importantly chemically from the porphyrin configuration because of the absence of a CH group between the No. 1 and No. 19 carbon atoms. The absence of this group in this position imparts a greater stability to the compound. This stability extends to the point that the metal cannot be removed from the corrin ring without the destruction of the total complex. Accordingly, the increased stability of the corrin configuration contributes to the advantageous use of the catalyst for the oxidation of mercapto compounds.

As hereinbefore set forth, any suitable catalyst containing the corrin configuration may be used in accordance with the present invention. Particularly preferred meal corrinoids contain cobalt as the metal. They may be isolated from the decomposition products of vitamin $B_{12}$. As hereinbefore set forth, other preferred metal derivatives include those of vanadium, iron and manganese which are obtained by synthesis.

In a preferred embodiment, one or more of the R substitutions in the above formula are carboxylate radicals including particularly those derived from acetic acid and propionic acid. It is understood that a mixture of these acid radicals may be present. In another preferred embodiment one or more of the R substituents is a sulfonyl group. The sulfonate or carboxylate derivatives are preferred when the catalyst is used in an alkaline medium in order to improve solubility of the catalyst in the alkaline medium.

When one or more of the Y groups are alkyl, they may be selected from the group consisting of methyl, ethyl, propyl, butyl, or mixtures thereof.

As hereinbefore set forth the corrin catalyst of the present invention may be prepared synthetically or isolated from any suitable source. For example, cobyrinic acid has been isolated from sewage sludge and recovered in crystalline form. It also appears as an intermediates in the biosynthesis of vitamin $B_{12}$. The cobyrinic acid may be used as such or serve as starting material for the preparation of other derivatives. As hereinbefore set forth any suitable derivative containing a corrinoid configuration may be used in accordance with the present invention.

While the corrin catalyst may be utilized as such, in another embodiment of the present invention it may be employed in association with a solid carrier. When used as a catalyst for the treatment of hydrocarbon fractions in the presence of alkaline solution, the support should be insoluble or substantially unaffected by the alkaline solution and hydrocarbons under the conditions of treating. Activated carbon is particularly preferred because of its high adsorptivity and stability under these conditions. Other carbon supports include coke, charcoal which may be obtained from any suitable source including bone char, wood charcoal, charcoal made from coconut or other nut shells, fruit pits, etc. Other supports include silica as, for example, sand, glass beads, etc., clays and silicates including those synthetically prepared and naturally occurring, preferably acid, heat or otherwise treated as, for example, Attapulgus clay, china clay, diatomaceous earth, feldspar, fuller's earth, halloysite, kaolin, kieselguhr, mica, montmorillonite, pumice, etc., aluminas and particularly alpha aluminas including corundum, emery, etc., ceramics, porcelain, various magnesium compounds, titanium compounds, zirconium compounds, resins, molecular sieves, etc. The choice of the support will be made with reference to its adsorptive or spacing properties and to its stability in the environment in which the composite is used.

The metal corrin compound may be composited with the carrier in any suitable manner. In one method the metal corrin may be dissolved in any suitable solvent and the solid carrier soaked, suspended, immersed or otherwise contacted therewith. In another method the solution of corrin compound may be sprayed onto or otherwise contacted with the solid carrier. A preferred solvent for this purpose comprises an alcohol and particularly methanol. Other solvents include ethanol, propanol, butanol, etc., acetone, methyl ethyl ketone, diethyl ketone, etc., dimethyl ether, diethyl ether, etc. In some cases a satisfactory solution may be prepared in water.

Treatment of the hydrocarbon distillate preferably is effected in the presence of an alkaline reagent, which is selected from those hereinbefore set forth. Conveniently, the corrin catalyst is soluble in the alkaline solution and is incorporated therein and utilized in this manner for effecting oxidation of the mercapto compounds. In other cases the corrin catalyst will be soluble in water to a satisfactory extent and may be used as a solution therein for effecting the desired oxidation of the mercapto compounds. In some cases it may be desirable to have a trace of alkaline material present in the treating zone. In still other cases a solution of the corrin catalyst may be prepared in aqueous ammonium hydroxide. It is understood that any suitable solution may be prepared and used in accordance with the present invention.

The corrin catalyst is very active and exceedingly stable. Because of its high activity the catalyst is used in exceedingly small concentrations. These may range from 5 to 1000 and preferably from 10 to 100 parts per million by weight of the alkaline solution, when employed, or from about 10 to 1,000 parts per million of the aqueous or other non-alkaline solvent when employed. The use of higher concentrations are unnecessary in most cases but may be employed, if desired, and thus may range up to 5% or more by weight.

As hereinbefore set forth, treating of the sour hydrocarbon distillate is effected by oxidation of mercaptans. Accordingly, an oxidizing agent is present in the reaction. Air is preferred, although oxygen or other oxygen-containing gases may be used. In some cases the sour petroleum distillate may contain entrained oxygen or air in sufficient concentration to accomplish the desired treating, but generally it is preferred to introduce air into the reaction. The amount of air must be sufficient to effect oxidation of the mercaptans, although a moderate excess of air generally is not objectionable.

Treating of the petroleum distillate may be effected in any suitable manner and may be in a batch or continuous process. In a batch process the sour hydrocarbon distillate is introduced into a reaction zone containing the corrin catalyst, and air is introduced therein or passed therethrough. Preferably the reaction zone is equipped with suitable stirrers or other mixing devices to obtain intimate contact. A continuous process will depend upon whether the catalyst is dissolved or carried in the solvent or is used as a fixed bed. In the former method, the solvent containing the catalyst is passed countercurrently to or concurrently with the sour petroleum distillate in the presence of a continuous stream of air. In another embodiment, the reaction zone contains the solvent and corrin catalyst, and the hydrocarbon distillate and air are continuously passed therethrough and removed, generally from the upper portion of the reaction zone. When the catalyst is used as a fixed bed, the hydrocarbon distillate and air are passed therethrough in either upward or downward flow.

In general the treating reaction is effected at ambient temperature. In some cases elevated temperature will be employed and generally will be within the range of 100° to about 400° F. or more, depending upon the pressure utilized therein, but usually below that at which substantial vaporization occurs. Atmospheric pressure or superatmospheric pressure up to 1000 pounds per square inch or more may be employed.

When used for the regeneration of alkaline reagent, the regeneration may be effected in any suitable manner and either in batch or continuous operation. In a continuous process, for example, the used alkaline reagent is continuously supplied to a regeneration zone containing the corrin catalyst and/or to which the corrin catalyst is continuously or intermittently introduced. Air, oxygen or other oxidizing gas is supplied to the regeneration zone. The regeneration may be effected at ambient temperature or at elevated temperature which generally will not exceed about 220° F. In the regeneration, mercaptans are oxidized to disulfides. Depending upon the particular operation employed, the caustic solution containing disulfides are removed, either from the upper or lower portion of the regeneration zone, and sent to a disulfide separator. The disulfides are withdrawn as an upper layer from the settler, and the regenerated caustic solution is recycled within the process for further use in extracting mercaptans from sour hydrocarbon distillate. When the corrin catalyst is composited with a support and the solid particles carried as a suspension in the caustic, the regenerated caustic solution containing the catalyst may be recycled as such or, when desired, may be separated in any suitable manner including filtration, settling or otherwise to remove the solid material prior to recycling of the caustic solution. In still other cases, the catalyst may be composited with a solid support and used as a fixed bed in the regeneration zone.

The following examples are introduced to illustrate further the novelty and utility of the present invention but not with the intention of unduly limiting the same.

*Example I*

The catalyst of this example is cobyrinic acid and is isolated from vitamin $B_{12}$. It is recovered in crystalline form and is used for the sweetening of a sour cracked gasoline having a mercaptan sulfur content of 0.01% by weight. The gasoline is subjected to sweetening by being passed into contact with 12° Baumé caustic solution containing 80 parts per million of the cobyrinic acid based upon the caustic solution. The gasoline is sweetened at ambient temperature. Air is introduced at a rate of 60 cubic feet per minute into the sweetening zone and the mixture of gasoline, caustic solution, catalyst and air are intimately contacted by means of a rotating blade. In a batch type operation, the reaction is continued until sweetening has proceeded to the desired extent, after which the reaction mixture is allowed to settle. The aqueous phase comprising caustic solution and catalyst is withdrawn from the lower portion of the sweetening zone. Air is vented from the upper portion of the sweetening zone, and the gasoline is removed from a mid-portion of the zone.

*Example II*

This example describes a combination extraction, caustic regeneration and final sweetening process. The sour gasoline is first treated at ambient temperature with caustic solution of about 15° Baumé by being passed upwardly through a descending stream of caustic solution. The partly treated gasoline is withdrawn from the upper portion of the treating zone, and the caustic solution containing mercaptides is passed to a regeneration zone. In the regeneration zone the caustic solution and air are passed at ambient temperature into contact with a solid bed of catalyst comprising activated charcoal containing 1% by weight of cobyrinic acid. The regenerated caustic solution and air from the regeneration zone are passed into a settling zone, from which excess air is vented and the regenerated caustic solution is withdrawn and returned for further use in extracting mercaptans from gasoline. The partly treated gasoline is withdrawn from the upper portion of the treating zone but still is sour. It is passed, together with air, 15° Baumé caustic solution containing cobalt corrin catalyst into a sweetening zone comprising a vibro-mixer. The sweetening is effected at a temperature of 100° F. and a pressure of 10 p.s.i.g. The reaction mixture is continuously withdrawn from the sweetening zone and passed to a settling zone. Excess air is vented from the upper portion of the settling zone. Sweetened gasoline is removed from a mid-portion of the settling zone. Caustic solution containing catalyst is withdrawn from the lower portion of the settling zone and is returned to the sweetening zone for further use in the process. In order to insure the availability of the required catalyst, additional catalyst is introduced periodically into the caustic solution being recycled to the sweetening zone.

What I claim as my invention:

1. A method of treating a sour hydrocarbon fraction which comprises reacting mercaptans contained in said fraction with free oxygen in contact with an alkaline reagent and a corrinoid catalyst.

2. A method of treating a sour hydrocarbon fraction which comprises reacting mercaptans contained in said fraction with free oxygen in contact with an alkaline reagent and a cobalt corrin catalyst.

3. A method of treating a sour hydrocarbon fraction which comprises reacting mercaptans contained in said fraction with free oxygen in contact with an alkaline reagent and cobyrinic acid catalyst.

4. A method of treating a sour hydrocarbon fraction which comprises reacting mercaptans contained in said fraction with free oxygen in contact with an alkaline reagent and a vanadium corrin catalyst.

5. A method of treating sour hydrocarbon fraction which comprises reacting mercaptans contained in said fraction with air in contact with an alkaline reagent and a cobalt corrin sulfonate catalyst.

6. A method of treating a sour hydrocarbon distillate which comprises reacting mercaptans contained in said distillate with air in contact with an alkaline reagent and a cobalt corrin carboxylate catalyst.

7. A method of treating a sour hydrocarbon distillate which comprises reacting mercaptans contained in said distillate with air in contact with caustic solution and cobyrinic acid.

8. A method of treating a sour hydrocarbon distillate which comprises reacting mercaptans contained in said distillate with air in contact with caustic solution and a cobalt corrin sulfonate catalyst.

9. A method of treating a sour hydrocarbon distillate which comprises reacting mercaptans contained in said distillate with air in contact with an alkaline reagent and a vanadium corrin carboxylate catalyst.

10. A method of regenerating a used alkaline reagent containing a mercapto compound which comprises reacting the same with free oxygen in contact with a corrin catalyst.

11. A method of regenerating a caustic solution previously used for the removal of acidic components from hydrocarbon distillate, which comprises reacting mercapto compounds contained in said caustic solution with air in contact with a cobalt corrin carboxylate catalyst.

12. A method of regenerating a caustic solution previously used for the removal of acidic components from hydrocarbon distillate, which comprises reacting mercapto compounds contained in said caustic solution with air in contact with a vanadium corrin carboxylate catalyst.

13. A method of regenerating a caustic solution previously used for the removal of acidic components from hydrocarbon distillate, which comprises reacting mercapto compounds contained in said caustic solution with air in contact with a cobalt corrin sulfonate catalyst.

14. A method of regenerating a caustic solution previously used for the removal of acidic components from hydrocarbon distillate, which comprises reacting mercapto compounds contained in said caustic solution with air in contact with a vanadium corrin sulfonate catalyst.

References Cited by the Examiner

UNITED STATES PATENTS

| | | | |
|---|---|---|---|
| 2,738,302 | 3/1956 | Kaczka et al. | 167—81 |
| 2,745,787 | 5/1956 | McCormick et al. | 167—81 |
| 2,907,697 | 10/1959 | Costello et al. | 167—81 |
| 3,148,137 | 9/1964 | Strong | 208—206 |
| 3,148,156 | 9/1964 | Henry | 208—206 |

DELBERT E. GANTZ, *Primary Examiner.*

R. H. SHUBERT, *Assistant Examiner.*